(12) United States Patent
Gladden

(10) Patent No.: US 11,052,869 B2
(45) Date of Patent: Jul. 6, 2021

(54) SEATBELT IGNITION INTERLOCK SYSTEM

(71) Applicant: Issac Gladden, Stone Mountain, GA (US)

(72) Inventor: Issac Gladden, Stone Mountain, GA (US)

( * ) Notice: Subject to any disclaimer, the term of this patent is extended or adjusted under 35 U.S.C. 154(b) by 193 days.

(21) Appl. No.: 16/509,736

(22) Filed: Jul. 12, 2019

(65) Prior Publication Data
US 2020/0017067 A1 Jan. 16, 2020

Related U.S. Application Data

(60) Provisional application No. 62/696,975, filed on Jul. 12, 2018.

(51) Int. Cl.
*B60R 22/48* (2006.01)

(52) U.S. Cl.
CPC ...... *B60R 22/48* (2013.01); *B60R 2022/4816* (2013.01); *B60R 2022/4883* (2013.01); *B60R 2022/4891* (2013.01)

(58) Field of Classification Search
CPC ............ B60R 22/48; B60R 2022/4816; B60R 2022/4866; B60R 2022/4883; B60R 2022/4891; B60R 2022/4808
USPC ....................................................... 180/270
See application file for complete search history.

(56) References Cited

U.S. PATENT DOCUMENTS

| | | | |
|---|---|---|---|
| 3,624,601 A * | 11/1971 | Routzahn | B60Q 1/52 180/270 |
| 3,864,668 A | 2/1975 | Bickford | |
| 6,260,650 B1 * | 7/2001 | Gustavsson | B60K 28/04 180/268 |
| 6,285,937 B1 * | 9/2001 | Buckley | B60R 21/013 280/735 |
| 6,362,734 B1 * | 3/2002 | McQuade | B60R 22/48 180/267 |
| 7,132,934 B2 | 11/2006 | Allison | |
| 7,813,856 B2 * | 10/2010 | McCall | B60R 22/48 701/45 |
| 8,195,365 B2 * | 6/2012 | Bernhagen | B60R 22/48 701/45 |
| 8,217,796 B2 * | 7/2012 | Trummer | B60N 2/2812 340/573.1 |

(Continued)

FOREIGN PATENT DOCUMENTS

DE       102012020031 A1 *   4/2014   ......... A44B 11/2573

*Primary Examiner* — Ruth Ilan
(74) *Attorney, Agent, or Firm* — Boudwin Intellectual Property; Daniel Boudwin

(57) ABSTRACT

A seatbelt ignition interlock system. The system includes a plurality of sensor devices each including a housing, a latch configured to removably engage the latch receiver of a vehicle seatbelt system, a latch receiver configured to receive and removably engage the latch of the vehicle seatbelt system, a latch sensor, a temperature sensor, and a power source. Each sensor device is in electrical communication with a vehicle ignition interlock circuit, and the vehicle ignition interlock circuit is in electrical communication with an ignition of a vehicle. The vehicle ignition interlock circuit is configured to prevent the vehicle ignition from being started when a combination of temperature sensors and latch sensors determine that occupied seats have unfastened seatbelts.

18 Claims, 2 Drawing Sheets

(56) References Cited

U.S. PATENT DOCUMENTS

| | | | |
|---|---|---|---|
| 9,539,983 B2 * | 1/2017 | Demeritte | G08B 21/24 |
| 10,046,735 B1 * | 8/2018 | Johnson | G08B 21/02 |
| 10,507,790 B1 * | 12/2019 | Banks | B60R 22/48 |
| 10,549,717 B2 * | 2/2020 | Koase | B60R 22/48 |
| 10,562,451 B2 * | 2/2020 | Elliott | G08B 21/22 |
| 2008/0309061 A1 * | 12/2008 | Mundy | B60R 22/48 |
| | | | 280/801.1 |
| 2011/0203866 A1 | 8/2011 | Hinojosa et al. | |
| 2012/0268259 A1 | 10/2012 | Igel et al. | |
| 2015/0265200 A1 * | 9/2015 | Mahdi | B60R 22/48 |
| | | | 600/301 |
| 2016/0236648 A1 * | 8/2016 | Varner | B60R 22/48 |

* cited by examiner

SEATBELT IGNITION INTERLOCK SYSTEM

CROSS REFERENCE TO RELATED APPLICATIONS

This application claims the benefit of U.S. Provisional Application No. 62/696,975 filed on Jul. 12, 2018. The above identified patent application is herein incorporated by reference in its entirety to provide continuity of disclosure.

BACKGROUND OF THE INVENTION

The present invention relates to improvements in vehicle safety systems. More specifically, the present invention provides a seatbelt ignition interlock system that is configured to prevent a vehicle ignition from starting when one or more occupied passenger seats are determined to have unfastened seatbelts.

Seatbelts have been proven to be one of the most effective vehicle safety systems. When a driver or passenger wears their seatbelt while driving, the risk of a car accident resulting in serious injury or death is greatly reduced. Unfortunately, individuals sometimes forget to fasten their seatbelts, or choose not to use a seatbelt for personal reasons. Unbuckled passengers are at a much higher risk for injury. Unbuckled passengers can also cause injury to other passengers in the vehicle if a serious accident occurs. While seatbelts are legally required to be worn in most states, law enforcement can only police the wearing of seatbelts when they see a vehicle on the road that has unbelted occupants. In view of the above concerns, it is desirable to provide a seatbelt ignition interlock system that prevents a vehicle from being started unless it is detected that all vehicle occupants are wearing their seatbelts.

There exist devices in the art that relate to seatbelt ignition interlocks. These include devices that have been patented and devices that have been disclosed in patent application publications. However, these devices have several drawbacks. For example, the prior art devices fail to include a manual input mechanism for inputting the number of passengers in the vehicle. Further, the prior art devices fail to provide a combination of sensors including latch sensors and temperature sensors that work in concert to prevent a vehicle from starting if unbelted passengers are detected. In light of the devices disclosed in the known art, it is submitted that the present invention substantially diverges in design elements from the prior art and consequently it is clear that there is a need in the art for an improvement to existing seatbelt ignition interlock devices. In this regard the present invention substantially fulfills these needs.

SUMMARY OF THE INVENTION

In view of the foregoing disadvantages inherent in the known types of seatbelt ignition interlock systems now present in the prior art, the present invention provides a seatbelt ignition interlock system wherein the same can be utilized for providing convenience and safety for the user when traveling in a vehicle. In an exemplary embodiment, the seatbelt ignition interlock system includes a plurality of sensor devices, wherein each sensor device includes a housing, a latch configured to removably engage the latch receiver of a vehicle seatbelt system, a latch receiver configured to receive and removably engage the latch of the vehicle seatbelt system, a latch sensor, a temperature sensor, and a power source. Each sensor device is in electrical communication with a vehicle ignition interlock circuit. The vehicle ignition interlock circuit is in electrical communication with an ignition of a vehicle. The vehicle ignition interlock circuit is configured to prevent the vehicle ignition from starting the vehicle when the temperature sensor detects a temperature above a threshold level and the latch sensor detects either one of the vehicle seatbelt latch being disconnected from the sensor device latch receiver or the sensor device latch being disconnected from the latch receiver of the vehicle seatbelt system.

One object of the present invention is to provide a seatbelt ignition interlock system that includes all of the advantages of seatbelt ignition interlock systems in the known art and none of the disadvantages.

Another object of the present invention is to provide a seatbelt ignition interlock system that includes input controls for entering the current number of vehicle passengers into the system.

A further object of the present invention is to provide a seatbelt ignition interlock system that utilizes a combination of latch sensors and temperature sensors to prevent a vehicle from starting or disable a currently running vehicle when occupied seats have unlatched seatbelts.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
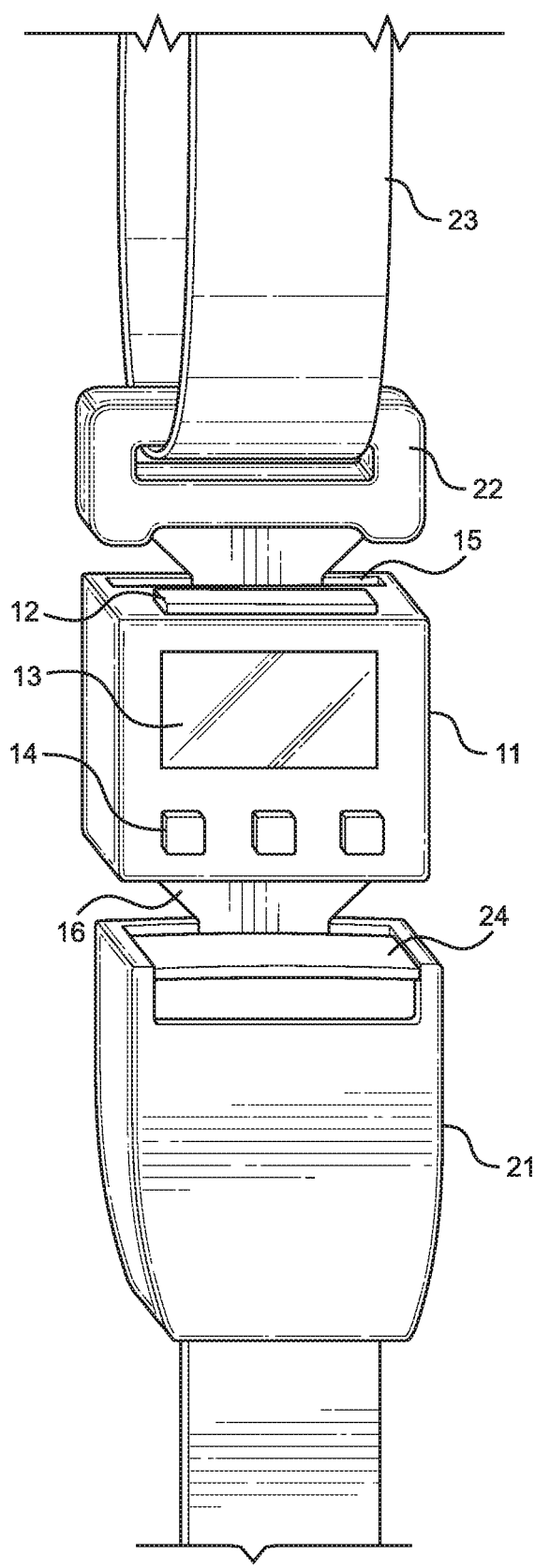
FIG. 1 shows a perspective view of a sensor device of the seatbelt ignition interlock system connected to a vehicle's seatbelt.

Reference is made herein to the attached drawings. Like reference numerals are used throughout the drawings to depict like or similar elements of the seatbelt ignition interlock system. For the purposes of presenting a brief and clear description of the present invention, the preferred embodiment will be discussed as used for preventing a vehicle from starting when an occupied passenger or driver seat is determined to have an unbuckled seatbelt. The figures are intended for representative purposes only and should not be considered to be limiting in any respect.

Referring now to FIG. 1, there is shown a perspective view of a sensor device of the seatbelt ignition interlock system connected to a vehicle's seatbelt. The seatbelt ignition interlock system includes a plurality of sensor devices 11 that are configured to be secured between a vehicle seatbelt latch 22 and the vehicle seatbelt latch receiver 21. The sensor device 11 includes a latch receiver 15 configured to receive and releasably engage the vehicle seatbelt latch 22. The sensor device 11 further includes a latch 16 configured to releasably engage the vehicle seatbelt latch receiver 21. The sensor device latch 16 corresponds to the shape and size of the vehicle's seatbelt latches 22, such that they easily connect to the vehicle latch receiver 21 and can be easily disconnected by depressing the vehicle latch receiver release button 24. The sensor device 11 is configured to detect when the sensor device latch 16 is secured within the vehicle latch receiver 21, in order to determine whether the occupant is using their seatbelt 23 properly.

In some embodiments, at least one of the sensor devices 11 includes input controls 14. In some embodiments, the sensor devices 11 include a display 13 for displaying information inputted via the input controls 14. The input controls 14 may include buttons, as shown in FIG. 1, or may include other mechanisms, wherein the display 13 may be a touchscreen, for example. The at least one sensor device 11 having controls and displays should be installed within the driver's seatbelt. The input controls 14 can be utilized by the driver to input the current number of passengers within the vehicle. In this way, the seatbelt ignition interlock system prevents the vehicle ignition from starting until the number of detected latched seatbelts is equal to the number that was inputted into sensor device 11.

The sensor device 11 further includes a lockable release button 12 that can selectively disconnect the vehicle seatbelt latch 22 from the sensor device latch receiver 15. The release button 12 remains in a default locked state so that occupants cannot remove the sensor device 11 to bypass the seatbelt ignition interlock system. In one embodiment, the lockable release button 12 can be unlocked by entering an unlock code using the input controls 14. In another embodiment, the lockable release button 12 may include a physical key. The lockable release button 12 allows the system to be easily installed in any vehicle with corresponding seatbelt latches and latch receivers.

Figure 2:
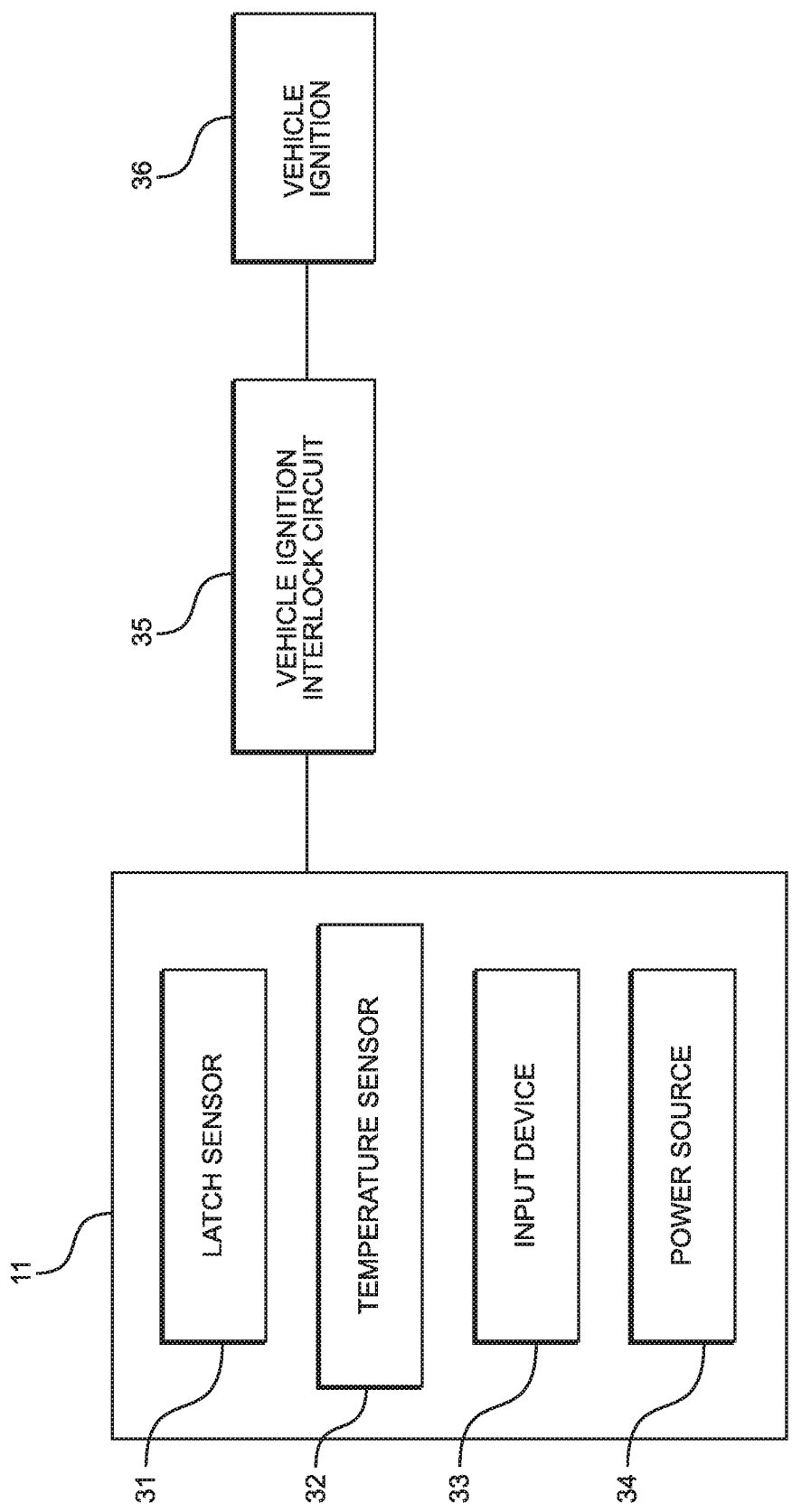
FIG. 2 shows a diagram of the components of the seatbelt ignition interlock system.

Referring now to FIG. 2, there is shown a diagram of the components of the seatbelt ignition interlock system. In the illustrated embodiment, the sensor device 11 includes a latch sensor 31, a temperature sensor 32, an input device 33, and a power source 34.

The power source 34 may be a battery disposed within the sensor device 11, a connection to the vehicle's dedicated battery, or any other suitable source of electrical energy. The latch sensor 31 is configured to determine whether or not the vehicle seatbelt to which the sensor device 11 is attached is currently buckled. The temperature sensor 32 is configured to measure the surrounding temperature within the vehicle seat to detect whether or not an occupant is currently in the vehicle seat. If a threshold temperature is detected by the temperature sensor 32, then the system adds that particular seatbelt to the total number of seatbelts that need to be buckled in order for the vehicle to be allowed to start. This prevents the system from erroneously locking the vehicle ignition 36 when an unoccupied seat is detected as having an unbuckled seatbelt.

The sensor devices 11 are in electrical communication with a vehicle ignition interlock circuit 35, which is in turn in electrical communication with the vehicle's ignition 36. The sensor devices 11 may be include wireless transceivers to facilitate wireless communication with the vehicle ignition interlock circuit 35. In other embodiments, the sensor devices 11 may be hardwired to the ignition interlock circuit 35. The ignition interlock circuit 35 can be integrated into the vehicle or may be added and subsequently connected, via a wireless transceiver or via a hardwired connection, to the vehicle ignition.

In operation, the vehicle ignition interlock circuit 35 is configured to prevent the vehicle ignition 36 from starting the vehicle when the temperature sensor 32 detects a temperature above a threshold level and the latch sensor 31 detects either one of the vehicle seatbelt latch being disconnected from the sensor device latch receiver or the sensor device latch being disconnected from the latch receiver of the vehicle seatbelt system. As a backup or to or in concert with the temperature sensors 32, the vehicle ignition interlock circuit 35 is configured to prevent the vehicle ignition 36 from starting the vehicle when the latch sensors 31 detect a total number of latched seatbelts that is less than the number of passengers inputted 33 into the at least one sensor device 11 that includes the input mechanisms and display.

In some embodiments, the system further includes an alarm mechanism. The alarm mechanism is configured to emit an audible alert when an attempt is made to start the vehicle and occupied seats with unlatched seatbelts are detected. In some embodiments, the system further includes the ability to shut down the vehicle engine if the seatbelts are disconnected for a threshold period of time while the engine is running. In other words, the vehicle ignition interlock circuit 35 may be configured to shut down the vehicle ignition 36 if a latch that was previously detected as being connected is then detected as being disconnected for a predetermined amount of time. In this way, the seatbelt ignition interlock system requires that all passengers be belted in if the vehicle engine is to be allowed to run, thereby ensuring the safety of all vehicle occupants.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seatbelt ignition interlock system, comprising:
a plurality of sensor devices, each sensor device comprising a housing, a latch configured to removably engage a latch receiver of a vehicle seatbelt system, a latch receiver configured to receive and removably engage a latch of the vehicle seatbelt system, a latch sensor, a temperature sensor, and a power source,
wherein each sensor device is in electrical communication with a vehicle ignition interlock circuit;
wherein the vehicle ignition interlock circuit is in electrical communication with an ignition of a vehicle; and
wherein the vehicle ignition interlock circuit is configured to prevent the vehicle ignition from starting the vehicle when the temperature sensor detects a temperature above a threshold level and the latch sensor detects either one of the vehicle seatbelt latch being disconnected from the sensor device latch receiver or the sensor device latch being disconnected from the latch receiver of the vehicle seatbelt system.

2. The seatbelt ignition interlock system of claim 1, wherein at least one sensor device of the plurality of sensor devices comprises a display and one or more input controls, wherein the system is configured to receive an input corresponding to a number of passengers in the vehicle.

3. The seatbelt ignition interlock system of claim 2, wherein the vehicle ignition interlock circuit is configured to prevent the vehicle ignition from starting the vehicle when the latch sensors detect a total number of latched seatbelts that is less than the number of passengers inputted into the at least one sensor device.

4. The seatbelt ignition interlock system of claim 1, wherein the vehicle ignition interlock circuit is configured to shut down the vehicle ignition if a latch that was previously detected as being connected is then detected as being disconnected for a predetermined amount of time.

5. The seatbelt ignition interlock system of claim 1, wherein the power source comprises an electrical connection to a battery of the vehicle.

6. The seatbelt ignition interlock system of claim 1, wherein the power source comprises a battery.

7. The seatbelt ignition interlock system of claim 1, wherein each sensor device latch receiver comprises a release button configured to disengage the vehicle seatbelt system latch from the sensor device latch receiver.

8. The seatbelt ignition interlock system of claim 7, wherein each sensor device latch receiver release button is configured to be lockable so as to selectively prevent the sensor device from being disconnected from the vehicle seatbelt system latch.

9. The seatbelt ignition interlock system of claim 2, wherein the display comprises a touch screen.

10. A seatbelt ignition interlock system, comprising:
a plurality of sensor devices, each sensor device comprising a housing, a latch configured to removably engage a latch receiver of a vehicle seatbelt system, a latch receiver configured to receive and removably engage a latch of the vehicle seatbelt system, a latch sensor, a temperature sensor, and a power source;
wherein each sensor device is in electrical communication with a vehicle ignition interlock circuit;
wherein the vehicle ignition interlock circuit is in electrical communication with an ignition of a vehicle;
wherein the vehicle ignition interlock circuit is configured to prevent the vehicle ignition from starting the vehicle when the temperature sensor detects a temperature above a threshold level and the latch sensor detects either one of the vehicle seatbelt latch being disconnected from the sensor device latch receiver or the sensor device latch being disconnected from the latch receiver of the vehicle seatbelt system; and
an alarm mechanism configured to emit an audible alert if an attempt is made to start the vehicle ignition and the latch sensor detects the sensor device latch being disconnected from the latch receiver of the vehicle seatbelt system.

11. The seatbelt ignition interlock system of claim 10, wherein at least one sensor device of the plurality of sensor devices comprises a display and one or more input controls, wherein the system is configured to receive an input corresponding to a number of passengers in the vehicle.

12. The seatbelt ignition interlock system of claim 11, wherein the vehicle ignition interlock circuit is configured to prevent the vehicle ignition from starting the vehicle when the latch sensors detect a total number of latched seatbelts that is less than the number of passengers inputted into the at least one sensor device.

13. The seatbelt ignition interlock system of claim 10, wherein the vehicle ignition interlock circuit is configured to shut down the vehicle ignition if a latch that was previously detected as being connected is then detected as being disconnected for a predetermined amount of time.

14. The seatbelt ignition interlock system of claim 10, wherein the power source comprises an electrical connection to a battery of the vehicle.

15. The seatbelt ignition interlock system of claim 10, wherein the power source comprises a battery.

16. The seatbelt ignition interlock system of claim 10, wherein each sensor device latch receiver comprises a release button configured to disengage the vehicle seatbelt system latch from the sensor device latch receiver.

17. The seatbelt ignition interlock system of claim 16, wherein each sensor device latch receiver release button is configured to be lockable so as to selectively prevent the sensor device from being disconnected from the vehicle seatbelt system latch.

18. The seatbelt ignition interlock system of claim 11, wherein the display comprises a touch screen.

* * * * *